Oct. 16, 1951      R. T. KELLER      2,571,254
MANIFOLD STRUCTURE
Filed May 18, 1950      2 Sheets-Sheet 1
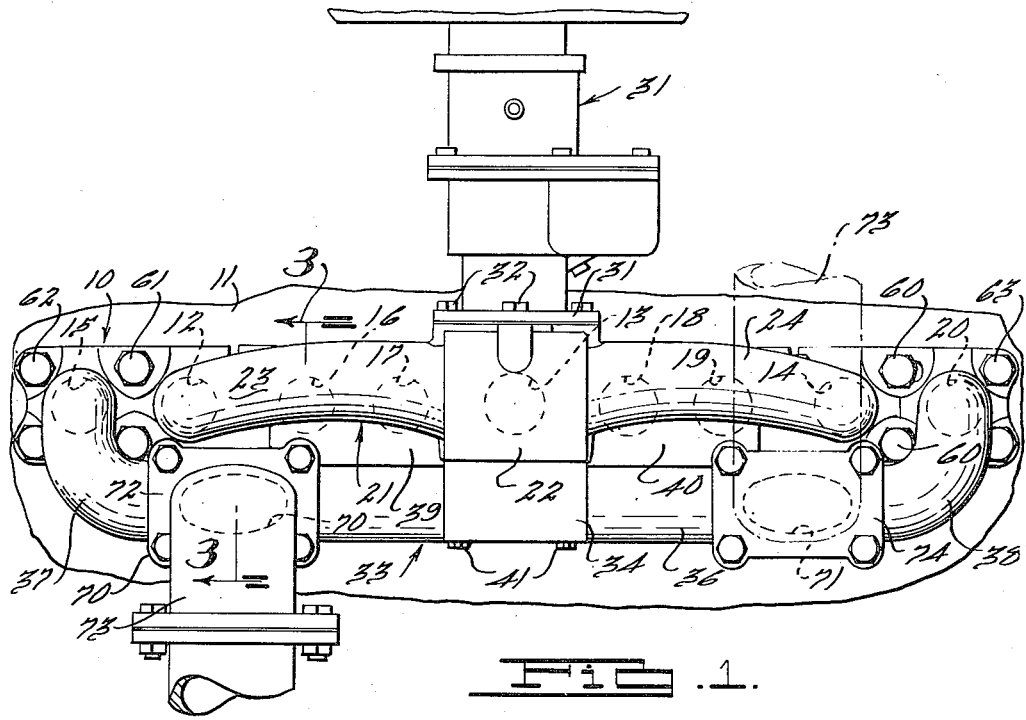
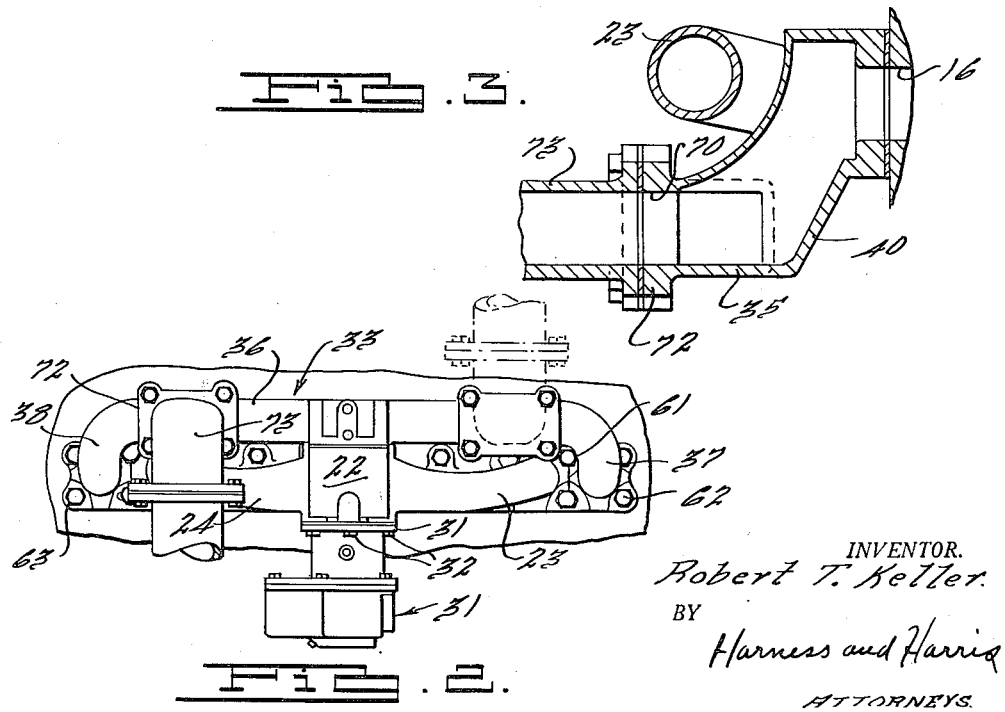
INVENTOR.
Robert T. Keller.
BY
Harness and Harris
ATTORNEYS.

Oct. 16, 1951 R. T. KELLER 2,571,254
MANIFOLD STRUCTURE
Filed May 18, 1950 2 Sheets-Sheet 2
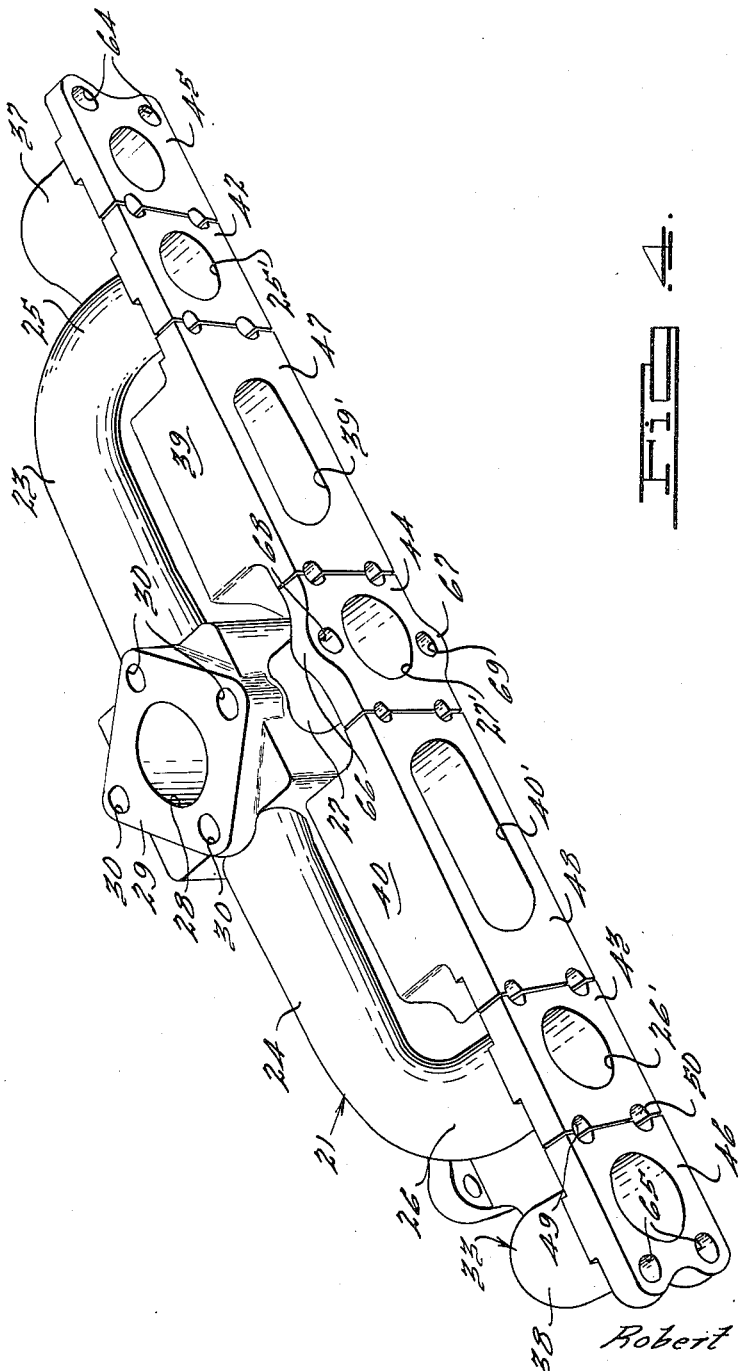
INVENTOR.
Robert T. Keller.
BY Harness and Harris
ATTORNEYS Patented Oct. 16, 1951

2,571,254

UNITED STATES PATENT OFFICE 2,571,254

MANIFOLD STRUCTURE

Robert T. Keller, Grosse Pointe, Mich., assignor to Chrysler Corporation, Highland Park, Mich., a corporation of Delaware Application May 18, 1950, Serial No. 162,770

5 Claims. (Cl. 123—52)

My invention relates to internal combustion engines.

More particularly, my invention relates to a novel type of manifold structure for use with an internal combustion engine.

A principal object of my invention is to provide an internal combustion engine with an improved manifold structure which is readily adaptable for either updraft or downdraft carburation.

Another object of my invention is to provide improved manifold structure with aligned intake and exhaust branches which facilitates disposing the manifold in a plurality of positions.

A further object of my invention is to provide the exhaust portion of an engine manifold structure with improved means for effecting selective attachment of the exhaust pipe structure thereto.

Still another object of my invention is to provide an improved manifold structure which is easily and economically manufactured as well as readily applied to an internal combustion engine.

Other objects and advantages will become more apparent from the following description of one embodiment of my invention, reference being had to the accompanying drawings in which:

Fig. 1 is a side elevational view of my improved manifold structure illustrating its application for downdraft carburation.

Fig. 2 is another side elevational view of the manifold structure showing its application for updraft carburation.

Fig. 3 is a transverse sectional view taken on the line 3—3 of Fig. 1.

Fig. 4 is a perspective view of my improved manifold assembly.

In the drawings I have shown my improved manifold structure, generally designated by the numeral 10, mounted on a vehicle engine block 11. The engine block 11 is provided with intake ports 12, 13 and 14 which are symmetrically disposed between exhaust ports 15, 16, 17, 18, 19 and 20. The intake and exhaust ports are aligned in the longitudinal direction of the engine block and the intake port 12 is disposed between exhaust ports 15 and 16, the intake port 13 is disposed between exhaust ports 17 and 18 and the intake port 14 is disposed between exhaust ports 19 and 20. The intake and exhaust ports are symmetrically arranged on each side of the intake port 14, are supplied with bolt receiving apertures adjacent thereto, and are adapted to communicate with portions of the manifold structure 10 as hereinafter set forth. Each intake port 12, 13 and 14 serves two cylinders through branched passages in the engine.

The manifold structure 10 comprises an intake manifold member, generally designated by the numeral 21, which comprises a center portion 22 having oppositely extending longitudinal tubular branches 23 and 24. The branch 23 is provided with an end portion 25 which extends transversely of the engine block and is provided with an opening 25' which registers with the intake port 12 in the engine block while the branch 24 is provided with an end portion 26 which also extends transversely of the engine block and has an opening 26' which registers with the intake port 14 in the engine block. The center portion 22 of the intake manifold member 21 is also provided with a tubular conduit or branch 27 which is relatively shorter than branches 23 and 24 and which extends from the center portion to the intake port 13 in the engine block and has an opening 27' in registration therewith. My improved manifold structure is more readily adapted to a 6 cylinder internal combustion engine and each of the branches 23, 24 and 27 are adapted to provide a mixture of fuel and air to two cylinders. The center portion 22 is substantially cubicle in configuration, is hollow so that all branches communicate with each other and is provided on its upper face with a raised portion 28. The raised portion 28 is offset relative to the upper face of the center portion 22 and is provided with an opening 29 as well as bolt receiving apertures 30 for facilitating and mounting of a carburetor 31 on the portion 28. The carburetor 31 is preferably provided, as shown in Fig. 1, with a mounting plate 32 which conforms to the configuration of the raised portion 28 as well as bolts 32 which bolt the mounting plate 31 to the raised portion 28. The carburetor is provided with a passage (not shown) which registers with the opening 29 in the raised portion 28 for allowing flow of the fuel mixture into the intake manifold member.

The manifold structure 10 is provided with an exhaust manifold member, generally designated by the numeral 33, which includes a center portion 34 having oppositely extending tubular exhaust manifold branches 35 and 36. As viewed in Fig. 1, the exhaust manifold branch 35 is provided with an end portion 37 which curves first upwardly and then transversely of the engine block and has an opening 37' which registers with the exhaust port 15 in the block. Similarly, the exhaust manifold branch 36 is provided with an end portion 38 which extends first upwardly and then transversely of the engine block and is provided with an opening 38' in registration with the exhaust port 20 in the engine block. The exhaust manifold member 33 is also provided with a transversely extending hollow branch 39 which extends from the branch 35 at a location adjacent the center portion 34 to the engine block and which has a passage 34' of oval cross sectional configuration in registration with the exhaust ports 16 and 17. Similarly, the branch 36 of the exhaust manifold member is provided with a transversely extending branch 40 which extends from the branch 36 at a location adjacent the center portion 34 to the engine block and which has a passage 40' of oval cross sectional configuration in registration with the exhaust ports 18 and 19. The manifold members 21 and 33 are preferably formed of cast iron and may be secured together if desired at the center portions of each by bolts 41 which extend through the center portion of the exhaust manifold member into the center portion of the intake manifold member.

As more clearly seen in perspective Fig. 4, the end portions of the branches 23 and 24 as well as the end portion of the branch 27 are provided with mounting pads or members 42, 43 and 44, respectively. Similarly, the end portions of the branches 37, 38, 39 and 40 of the exhaust manifold member are provided with mounting pads or members 45, 46, 47 and 48, respectively. The respective mounting pads of both the intake and exhaust manifold member are symmetrically arranged on each side of the mounting pad 44, the mounting pads 47 and 48 being of equal size, the mounting pads 42 and 43 being of equal size, and the mounting pads 45 and 46 being identical in configuration with the exception that one is turned 180° relative to the other. The mounting pads of both manifold members are preferably cast as an integral part of the manifold members, are of equal height and are provided with symmetrically arranged bolt receiving apertures which receive bolts, some of which are shown at 60, 61, 62 and 63 for securing the pads to the engine block. The bolts extend through these apertures formed by the pads and are threaded into the apertures in the engine block which are arranged adjacent the intake and exhaust ports and symmetrically relative to the port 13. The pads 43 and 46 are provided with cooperating recesses or annular grooves for forming apertures 49 and 50, these apertures 49 and 50 being the same distances from the upper and lower edge of the pads, respectively. Similarly, each vertical side of each mounting pad is provided with a pair of symmetrically disposed recesses which cooperate with the recesses of the adjacent pads to form bolt receiving apertures. Fig. 1 shows bolts 60 extending through apertures 49 and 50 which are formed by pads 43 and 46 and into apertures in the engine block. Similarly, bolts are provided for securing all of the adjacent mounting pads to the engine block and these bolts are threaded into apertures symmetrically disposed in the engine block.

The pads 45 and 46 are provided with bolt receiving apertures 64 and 65, respectively, for receiving bolts to secure the free end portions of the pads to the engine. These apertures are also symmetrically arranged about the center pad 44. The center pad 44 of the intake manifold is provided with enlarged or bulged upper and lower end portions 66 and 67, respectively, which accommodate vertically aligned bolt receiving apertures 68 and 69, respectively. The apertures 68 and 69 receive bolts (not shown) which secure the pad 44 to the engine block. It may be seen, as viewed in Fig. 4, that the symmetrically arranged pads of the respective branches of the intake and exhaust manifold members are longitudinally aligned and present a uniform surface which may be conveniently secured to the engine block. By this construction the entire manifold structure may be inverted with respect to its position shown in Fig. 2 and secured to the engine block by utilizing the same bolts and apertures. This may be accomplished due to the symmetric arrangement of the branches, mounting pads and bolt receiving apertures on the opposite sides of the mounting pad 44. In the construction shown in Fig. 2 the exhaust branches 39 and 40 no longer register with the exhaust ports 16 and 17, and 17 and 18 but rather with 18 and 19, and 16 and 17, respectively. Similarly, the end portions 25 and 26 of the intake branches 23 and 24 now register with intake ports 13 and 12, respectively. The opposite arrangement also holds true for the exhaust branches 37 and 38. The intake branch 27 still remains in registration with the intake port 13.

It will be readily seen therefore that my improved manifold structure may be disposed in a first position in which a downdraft carburetor 31 may be mounted on top of the entire structure as viewed in Fig. 1, or in the alternative, the manifold assembly may be arranged in an inverted position, as viewed in Fig. 2, in which an updraft carburetor may be mounted on the bottom of the assembly. The carburetor in both views is secured to the raised portion 28 on the center portion of the intake manifold member. It follows therefore that from this construction, either an updraft or downdraft carburetor may be employed with my manifold structure.

The exhaust manifold branches 35 and 36 are provided with openings 70 and 71, respectively, either one of which may be provided with a mounting pad 72 for securing exhaust pipe structure 73 thereto. The exhaust pipe structure 73 may be in registration with either of the openings depending on the desired location of such structure, the opening which is not secured to the exhaust pipe structure being provided with a closure 74. The exhaust pipe structure may be located at either the location shown by the full lines in the drawing or the location shown by the broken lines. The exhaust pipe structure may also be secured to the exhaust manifold member when it extends from a direction opposite to that shown in the drawing.

My improved manifold structure may be universally applied to internal combustion engines due to its adaptability to either an updraft or downdraft carburetor. The mounting surface of the manifold which includes all pads is always the same even though the manifold may be rotated 180°.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. In a multiple cylinder internal combustion engine having longitudinally aligned intake and exhausts ports symmetrically arranged on opposite sides of a transverse vertical plane of said engine, an intake and exhaust manifold assembly comprising intake and exhaust manifold members, said exhaust manifold member including a hollow main body portion extending longitudinally of said engine at a location spaced vertically from said longitudinally aligned ports and having spaced branches extending in a direction transversely of said main body portion, each of said exhaust manifold branches having a free end provided with an opening in the plane of and registering with one of said engine exhaust ports, respectively, said intake manifold member including a main body portion vertically aligned with the main body portion of said exhaust manifold member and mainly horizontally aligned with said longitudinally aligned ports and having spaced branches, each extending horizontally between a pair of adjacent branches of said exhaust manifold member and each having a free end provided with an opening in the plane of and registering with one of said intake ports respectively, and complementary mounting pads on said free ends of the branches of both of said members having mounting bolt receiving apertures symmetrically arranged with respect to said transverse vertical plane of said engine, for bringing the openings of the branches of said intake and exhaust manifold members into registration with said respective intake and exhaust ports when said assembly is disposed to bring either of said manifold members into superimposed relation with respect to the other.

2. In a multiple cylinder internal combustion engine having longitudinally aligned intake and exhaust ports symmetrically arranged on opposite sides of a transverse vertical plane of said engine, an intake and exhaust manifold assembly comprising intake and exhaust manifold members, said exhaust manifold member including a main body portion extending longitudinally of said engine and having spaced branches extending in a direction transversely of said body portion, each of said exhaust manifold branches having a free end provided with an opening in the plane of and registering with one of said engine exhaust ports, respectively, said intake manifold member including a body portion and spaced branches, each extending horizontally between a pair of adjacent branches of said exhaust manifold member and each having a free end provided with an opening in the plane of and registering with one of said intake ports, respectively, and complementary mounting pads on said free ends of the branches of both of said members having mounting bolt receiving apertures symmetrically arranged with respect to said transverse vertical plane of said engine, for bringing the openings of the branches of said intake and exhaust manifold members into registration with said respective intake and exhaust ports when said assembly is disposed to bring either of said manifold members into superimposed relation with respect to the other.

3. In a multiple cylinder internal combustion engine having longitudinally aligned intake and exhaust ports symmetrically arranged on opposite sides of a transverse vertical plane of said engine, an intake and exhaust manifold assembly comprising intake and exhaust manifold members, said exhaust manifold member including a main body portion extending longitudinally of said engine and having spaced branches extending in a direction transversely of said body portion, each of said exhaust manifold branches having a free end provided with an opening in the plane of and registering with one of said engine exhaust ports, respectively, said intake manifold member including a body portion longitudinally aligned with the body portion of said exhaust manifold and having a generally horizontally extending surface and having an air and fuel inlet opening disposed in said surface with carburetor mounting means associated therewith, said intake manifold member and spaced branches, each extending horizontally between a pair of adjacent branches of said exhaust manifold member and each having a free end provided with an opening in the plane of and registering with one of said intake ports, respectively, and complementary mounting pads on said free ends of the branches of both of said members having mounting bolt receiving apertures symmetrically arranged with respect to said transverse vertical plane of said engine, the symmetrical arrangement of said ports, pads and bolt receiving apertures accommodating the selective installation of said assembly with said air and fuel inlet opening directed upwardly or in the alternative, downwardly, to thereby adapt the intake manifold member for the selective reception of a downdraft or an updraft carburetor.

4. In a multiple cylinder internal combustion engine having intake and exhaust ports symmetrically arranged on opposite sides of a transverse vertical plane of said engine, an intake and exhaust manifold assembly comprising intake and exhaust manifold members, said exhaust manifold member including branches each of which is provided with a free end having an opening in the plane of and registering with one of said engine exhaust ports, said intake manifold member including branches each of which is provided with a free end having an opening in the plane of and registering with one of said engine intake ports, said intake manifold member having a generally horizontally extending surface and having an air and fuel inlet opening disposed in said surface with carburetor mounting means associated therewith, and complementary mounting pads on the free ends of the branches of both of said manifold members having mounting bolt receiving apertures symmetrically arranged with respect to said transverse vertical plane of said engine, the symmetrical arrangement of said ports, pads and bolt receiving apertures accommodating the selective installation of said assembly with said air and fuel inlet opening directed upwardly or in the alternative, downwardly, to thereby adapt the intake manifold member for the selective reception of a downdraft or an updraft carburetor.

5. In a multiple cylinder internal combustion engine having intake and exhaust ports symmetrically arranged on opposite sides of a transverse vertical plane of said engine, an intake and exhaust manifold assembly comprising intake and exhaust manifold members, said exhaust manifold member including branches each of which is provided with a free end having an opening in the plane of and registering with one of said engine exhaust ports, said intake manifold member including branches each of which is provided with a free end having an opening in the plane of and registering with one of said engine intake ports, said intake manifold member having a generally horizontally extending surface and having an air and fuel inlet opening disposed in said surface with carburetor mounting means associated therewith, and complementary mounting pads on the free ends of the branches of both of said manifold members having mounting bolt receiving apertures symmetrically arranged with respect to said transverse vertical plane of said engine, the symmetrical arrangement of said ports, pads and bolt receiving apertures accommodating the selective installation of said assembly with said air and fuel inlet opening directed upwardly or in the alternative, downwardly, to thereby adapt the intake manifold member for the selective reception of a downdraft or an updraft carburetor, said exhaust manifold member being provided with a plurality of apertures for selective registration with an exhaust fumes conducting conduit.

ROBERT T. KELLER.

No references cited.